United States Patent
Inuzuka

[11] Patent Number: 6,154,482
[45] Date of Patent: Nov. 28, 2000

[54] SPREAD SPECTRUM COMMUNICATIONS SYSTEM AND RECEIVER

[75] Inventor: Hiroyuki Inuzuka, Kariya, Japan

[73] Assignee: Kabushiki Kaisha Toyoda Jidoshokki Seisakusho, Aichi-Ken, Japan

[21] Appl. No.: 08/807,380

[22] Filed: Feb. 27, 1997

[30] Foreign Application Priority Data

Mar. 1, 1996 [JP] Japan .................................. 8-045067

[51] Int. Cl.$^7$ .............................. H04B 15/00; H04K 1/00; H04L 27/30
[52] U.S. Cl. ........................ 375/130; 375/206; 375/207; 375/208; 375/209; 375/210
[58] Field of Search .................................. 375/200, 206, 375/207, 208, 209, 210

[56] References Cited

U.S. PATENT DOCUMENTS

| | | | |
|---|---|---|---|
| 4,651,327 | 3/1987 | Fujita | 375/200 |
| 5,216,691 | 6/1993 | Kaufmann | 375/206 |
| 5,241,561 | 8/1993 | Barnard | 375/206 |
| 5,311,544 | 5/1994 | Park et al. | 375/206 |
| 5,381,446 | 1/1995 | McIntosh | 375/200 |
| 5,448,507 | 9/1995 | Strawn | 364/728.06 |
| 5,469,470 | 11/1995 | Takahashi | 375/208 |
| 5,506,862 | 4/1996 | McIntosh | 375/200 |
| 5,594,754 | 1/1997 | Dohi et al. | 375/200 |

*Primary Examiner*—Stephen Chin
*Assistant Examiner*—Michael W. Maddox
*Attorney, Agent, or Firm*—Morgan & Finnegan, L.L.P.

[57] ABSTRACT

When a multiplier receives data transmitted from a transmitting equipment in a spread spectrum communications system, it multiplies the received data by the periodic wave output from a crystal oscillator. The output data from the multiplier is filtered by a low-pass filter, and then binarized by a limiter. The multiplier and a delay circuit differential-decodes the binarized data. A correlation circuit obtains correlation between the decoded data and the PN code generated by the PN code generation circuit, and outputs the data as transfer data when the correlation is obtained. In another aspect, an input signal is divided, and then one is multiplied by an I-phase wave. Similarly, another is multiplied by a Q-phase wave. Each signal is individually processed and input to a correlation value/data value determination circuit. The correlation value/data value determination circuit compares an I-phase correlation value with a Q-phase correlation value, and obtains and outputs a data value of one of the phases whichever indicates a larger value.

11 Claims, 14 Drawing Sheets

SPREAD SPECTRUM COMMUNICATIONS SYSTEM AND RECEIVER

BACKGROUND OF THE INVENTION

1. Field of the Invention

The present invention relates to a spread spectrum communications system and receiver capable of demodulating received data without regenerating a carrier.

2. Description of the Related Art

The spread spectrum communications are established using a signal spread into a band much larger than a required frequency band in transmitting data. This spread spectrum communications system can be a direct sequence (DS) system, a frequency hopping system, a time hopping system, etc. depending on the spreading method. Described below is the DS system.

In the DS system, the transmission data is spread and modulated by multiplying the transmission data by a pseudo-noise (PN) code (spreading code) in a transmitting equipment to obtain a broadband spectrum spread signal. A PN code is used to generate binary data having a much higher frequency than normal transmission data. The width of the spectrum of the transmission data spread using the PN code equals the bandwidth of the PN code. The above described modulation is normally accompanied by the PSK modulation.

In the receiving equipment, a reverse-spreading process is performed by multiplying the data modulated in the transmitting equipment by the PN code used by the transmitting equipment so that the original transmission data can be retrieved. At this time, the phase of the PN code by which the received data is multiplied should be the same as that of the PN code used by the transmitting equipment. Therefore, a synchronous process is performed for phasing.

FIG. 1 is a block diagram showing the synchronous detection circuit in a receiving equipment of the above described spread spectrum communications system. An RF/IF circuit 101 converts the data transferred on the carrier of an RF band into the data of an IF band. A multiplier 102a multiplies the output data from the RF/IF circuit 101 by the carrier regenerated by the unit described later. The data output from the multiplier 102a passes through a low pass filter 103a and is input to a correlation circuit 104a. The correlation circuit 104a multiplies the input data by the PN code generated by a PN code generation circuit 105a, and outputs the timing-correlated data as regenerated data. The units 102b through 105b perform operations similar to those of the units 102a through 105a respectively.

A multiplier 106 multiplies the output of correlation circuits 104a and 104b (or low-pass filters 103a and 103b). A carrier regeneration circuit 107 comprises a voltage-controlled oscillator (VCO), and outputs a sine wave (regenerated carrier) at the frequency corresponding to the output voltage of the multiplier 106. The regenerated carrier output by the carrier regeneration circuit 107 is directly input to the multiplier 102b, and input to the multiplier 102a through a π/2 phase difference circuit 108.

Thus, in the synchronous detection circuit, a carrier is regenerated from received data, a received signal is converted into a base band using the regenerated carrier, the PN code is phase-synchronized between the transmitting equipment and the receiving equipment, and the data is retrieved in the receiving equipment.

The delay detection circuit shown in FIG. 2 is known as another configuration from which data is retrieved in the receiving equipment of the above described spread spectrum communications system. A multiplier 111 multiplies the data transferred on the carrier by the output from a delay circuit 112. The delay circuit 112 delays the data transferred on the carrier by a predetermined value (equal to the delay value used in differential coding in the transmitting equipment, for example, one chip of the PN code). The output of the multiplier 111 passes through a low-pass filter 113 and is input to a correlation circuit 114. The correlation circuit 114 multiplies the input data by the PN code generated by a PN code generation circuit 115, and outputs the timing-correlated data as regenerated data.

The synchronous detection circuit shown in FIG. 1 regenerates a carrier from received data using the carrier regeneration circuit 107. Since most carrier regeneration circuits 107 contain VCO and so on and perform analog processes, there is a drawback such that the entire circuits are large in scale.

The carrier should be precisely regenerated by the carrier regeneration circuit 107 so that the frequency of the regenerated carrier can match the frequency of the actual carrier (in this example, the frequency of the carrier converted by the RF/IF circuit 101). That is, when the frequency of the actual carrier is different from the frequency of the regenerated carrier, the correlation circuits 104a and 104b cannot detect a precise correlation timing, thereby failing in correctly regenerating data. However, as the frequency of a carrier becomes high, it is more difficult to regenerate the carrier and the entire cost increases because the electronic parts for high precision are normally expensive.

The delay detection circuit shown in FIG. 2 has also the disadvantage that the circuit scale is very large as with the above described synchronous detection circuit because most of the processes of the circuit are performed in an analog format.

The delay value of the delay circuit 112 is represented by, for example, one chip of the PN code, and should be very precise. That is, when a delay value error becomes large, a correct correlation timing cannot be detected by the correlation circuit 114, thereby failing in regenerating data. However, the required precision of a delay value is nanosecond in order. But, it depends on the band of the PN code, and it is hard to adjust the precision. Besides, there is the problem that the entire cost increases because the electronic parts for high precision are normally expensive.

SUMMARY OF THE INVENTION

The present invention aims at providing a spread spectrum communications system and receiver for transferring data without regenerating a carrier in a small-scale circuit.

The present invention further aims at providing a receiver of a spread spectrum communications system capable of receiving data without a bit error even if the frequency does not correspond to the phase when the signal transmitted on the carrier is multiplied by the frequency at the receiving equipment.

The receiver of the present invention is based on the spread spectrum communications system operated using a spreading code of a predetermined pattern when data is transferred, and includes the following units. An oscillation unit (for example, a crystal oscillator 2 shown in FIG. 3) outputs the carrier of a predetermined frequency. A multiplier (for example, a multiplier 1 shown in FIG. 3) multiplies the frequency output by the oscillation unit by the received data. A binarization unit (for example, a limiter 4 shown in FIG. 3) binarizes the output of the above described multiplier. A correlation unit (for example, a PN code generation circuit 7 and a correlation circuit 8 shown in FIG. 3) obtains the correlation between the output of the binarization unit and the spreading code.

Since a differential coding is performed in the transmitting equipment, the receiver according to the present invention may include a decoding unit (for example, a multiplier 5 and a delay circuit 6 shown in FIG. 3) for performing a differential coding on an output of the above described binarization unit using the delay circuit.

Based on the configuration of the receiver according to the present invention, can further include a data determination unit (for example, a correlation unit 21, a data holding circuit 22, an integrator 23, and a limiter 24 shown in FIG. 7A) for integrating the data input to the correlation unit at a correlated timing in the correlation unit, and for determining a digital value based on the integral value; or a data determining unit (for example, the correlation unit 21, a data holding circuit 22, and a 1-detection circuit 25 shown in FIG. 7B) for determining a digital value according to the number of chips of 0 and the number of chips of 1 in the data input to the correlation unit at the correlated timing in the correlation unit.

The spread spectrum communications system according to the present invention is based on the system of transferring data on a carrier of a predetermined frequency between a transmitter and a receiving device using a spreading code in a predetermined pattern during the data transfer, in which system the transmitter does differential-coding on the data to be transmitted and the receiving device does differential-decoding on received data. The above described receiver includes an oscillation unit for outputting a periodic wave of a predetermined frequency; a multiplication unit for multiplying the periodic wave output by the oscillation unit by the differential-coded data transmitted from the transmitter; a binarization unit for binarizing an output from the multiplication unit; a decoding unit for differential-decoding an output from the binarization unit by using a delay circuit; a correlation unit for obtaining the correlation between the differential-decoded data by the decoding unit and the spreading code; and a data determination unit for determining a digital value based on the data input to the correlation unit at a correlated timing in the correlation unit. The frequency of the spreading code is more than 4 times the difference between the frequency of the carrier and the frequency of the periodic wave.

The spread spectrum communications system according to the present invention is based on the system of performing a differential coding in a sending equipment and performing a differential decoding in a receiving unit using a spreading code in a predetermined pattern during the data transfer. The above described differential coding and decoding are performed using, as a delay value, the number of N times as large as one chip (N indicates a natural number) of the spreading code.

In the receiver according to the present invention, a periodic wave generated by the oscillator is used instead of the carrier regenerated from the received data. Therefore, it is not necessary to regenerate a carrier. Unless the frequency of the periodic wave matches the frequency of the actual carrier, a spreading code error may occur in chip units when the transfer data is regenerated. Therefore, a data determination unit is provided to avoid data error. For example, the data determination unit integrates the reverse spread data using the spreading code, and determines the digital value (0 or 1) of the data to be regenerated. Thus, the ratio of the number of erroneous chips to a plurality of chips assigned to the data bit can be reduced, thereby correctly reproducing the transferred data if the ratio of the frequency of the spreading code to the difference in frequency between the periodic wave and the actual carrier is set sufficiently large.

Since the data is digitized by the binarization unit, a digital process can be performed after the binarization, thereby eliminating the strict requirements for precision in analog data.

A further aspect of the receiver according to the present invention is based on the spread spectrum communications system for transmitting and receiving a spread-modulated base band signal on a carrier. It includes an oscillator for generating a first periodic wave having almost the same frequency as the carrier; a phaser for generating a second periodic wave by altering the phase of the first periodic wave; a first demodulation unit for demodulating a signal through reverse-spreading by multiplying the signal on the carrier by the first periodic wave; a second demodulation unit for demodulating the signal through reverse-spreading by multiplying the signal on the carrier by the second periodic wave; and a data value determination unit for receiving the signal demodulated by the first demodulation unit and the signal demodulated by the second demodulation unit and outputting a data value based on a predetermined process.

To perfectly obtain a base band signal by removing the carrier, a periodic wave should be generated in a way that the carrier perfectly matches the periodic wave both in phase and frequency (I-phase wave), and the received signal should be multiplied by the generated periodic wave. However, the carrier and the periodic wave are actually generated independently by the transmitter and receiver. Therefore, the phases and the frequencies cannot completely match between them. When the carrier is multiplied by the periodic wave with their phases and frequencies slightly varying from those of a carrier, a carrier offset arises (first carrier offset).

When a data value is demodulated through reverse-spreading, a bit error bursts out around the point where the first carrier offset changes the polarity. That is, the data values indicate 0 over a number of bits. This occurs around the point where the carrier offset changes the polarity. According to the present invention, a carrier is multiplied by a periodic wave having a shifted phase of the periodic wave oscillated by an oscillator. Since the generated carrier offset (second carrier offset) has a phase different from that of the first carrier offset, the first carrier offset and the second carrier offset is different in timing at which the polarity changes. At the point when the first carrier offset changes the polarity, a signal on the second carrier offset is obtained. At the point when the second carrier offset changes the polarity, a signal on the first carrier offset is obtained.

Thus, data values are obtained even if the phase and frequency of the periodic wave do not completely match those of the carrier with reception errors of a signal from bit errors successfully reduced.

Another configuration of the receiver according to the present invention is based on the above described configuration. A data value determination unit outputs a data value based on the sum of the first correlation value obtained by the first demodulation unit and the second correlation value obtained by the second demodulation unit.

With this configuration, a burst of bit error through a change of the polarity can be successfully avoided. That is, when the first carrier offset is in a polarity changing state, the second carrier offset is not in the state. Therefore, adding up the first and second correlation values can compensate the correlation value obtained by the first carrier offset by the correlation value obtained from the signal on the second carrier offset. If a data value is thus obtained, a data error can be successfully avoided. However, with such a configuration, reception precision is a little deteriorated, compared with the precision obtained when a data value is selected from the data obtained according to the signal containing the first carrier offset and the data obtained according to the signal containing the second carrier offset.

BRIEF DESCRIPTION OF THE DRAWINGS

FIG. 4A shows the differential coding circuit of the transmitter, and FIG. 4B shows the differential decoding circuit of the receiver;

DESCRIPTION OF THE PREFERRED EMBODIMENTS

The embodiments of the present invention are described below by referring to the attached drawings.

Figure 1:
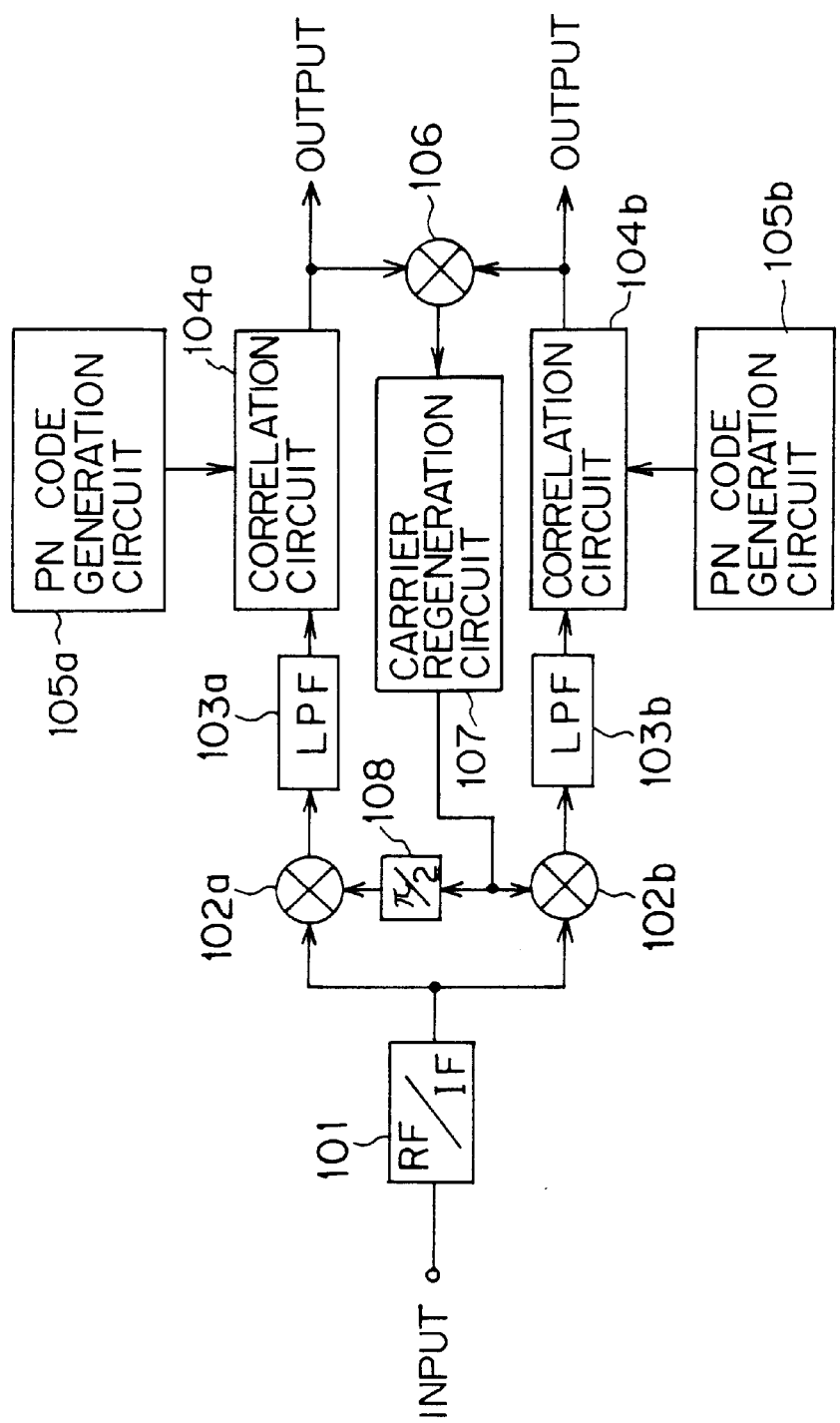
FIG. 1 is a block diagram showing the synchronous detection circuit in the receiving equipment of a spread spectrum communications system.
Figure 2:
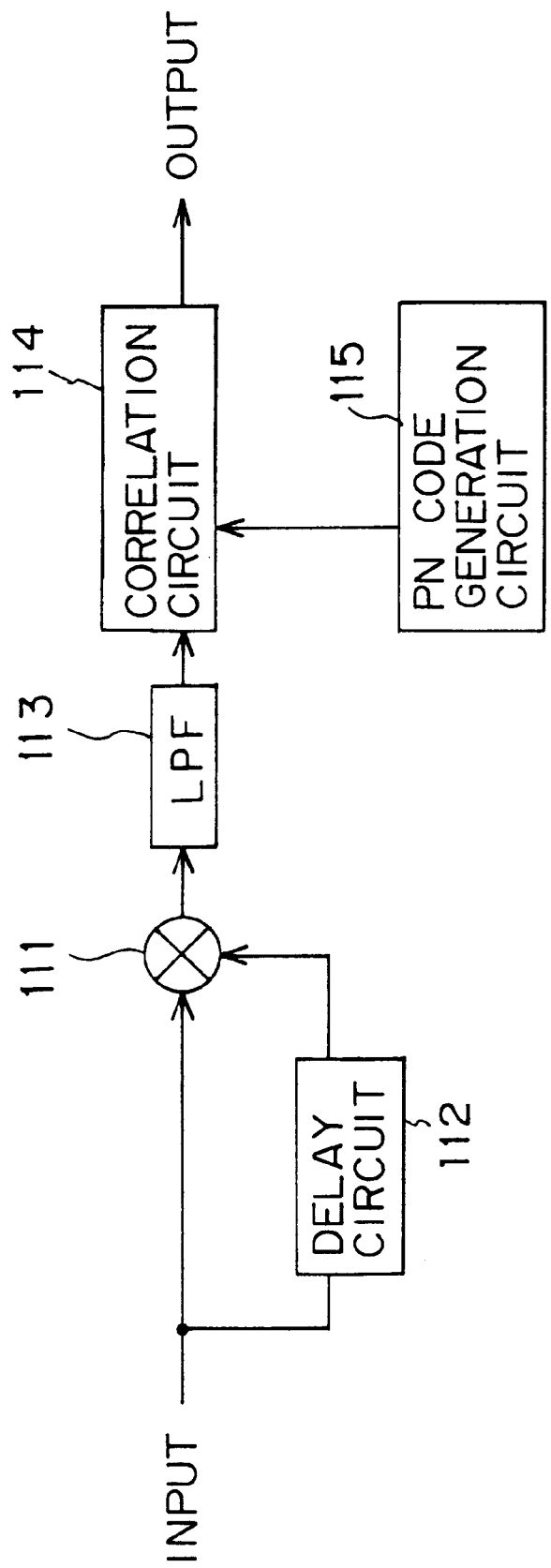
FIG. 2 is a block diagram showing the delay detection circuit in the receiving equipment of a spread spectrum communications system.
Figure 3:
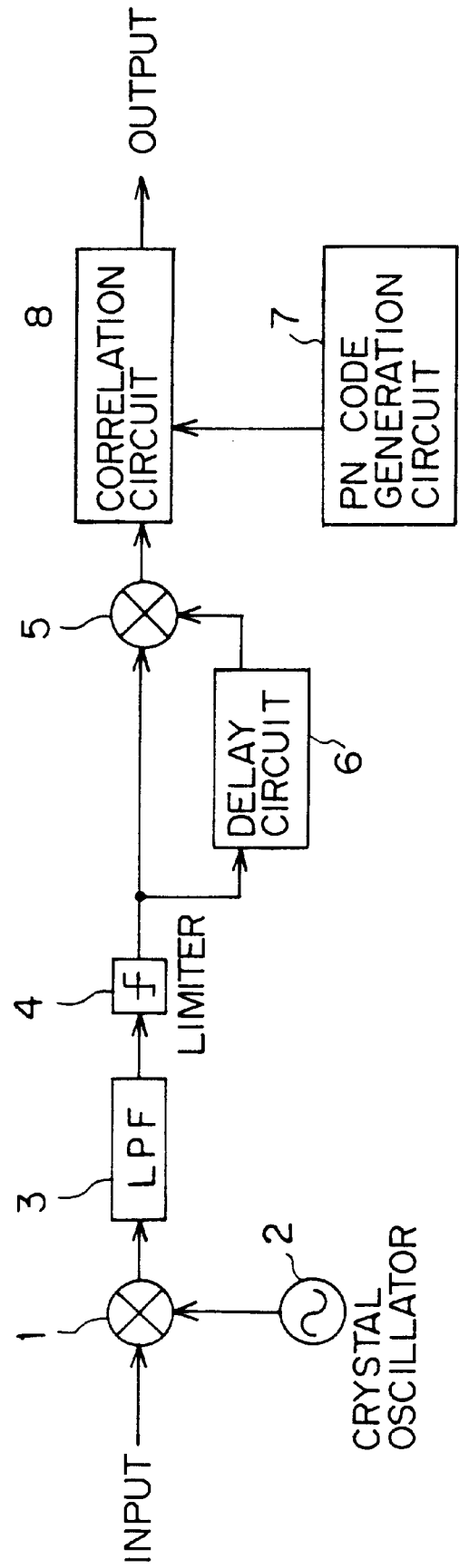
FIG. 3 is a block diagram showing the central configuration of the receiver in an embodiment of the spread spectrum communications system according to the present invention.

FIG. 3 is a block diagram showing the central configuration of the receiver according to an embodiment of the spread spectrum communications system of the present invention. The multiplier 1 multiplies the data transferred from the transmitter on the carrier by the output signal from the crystal oscillator 2. The frequency of the carrier is, for example, 2.4 GHz. The crystal oscillator 2 outputs the same periodic wave as the above described carrier, that is, the periodic wave of a fixed frequency of 2.4 GHz. A low-pass filter 3 passes only the signal around the base band and filters the output signal from the multiplier 1. The limiter 4 monitors the output value of the low-pass filter 3 in one chip unit of the PN code, and binarizes (digitalizes) the data based on the correlation between the output value and a predetermined limit value. That is, the limiter 4 performs a 1-bit A/D conversion process.

The multiplier 5 multiplies the output signal of the limiter 4 by the output signal of the delay circuit 6. The delay circuit 6 delays and inputs the output signal of the limiter 4 to the multiplier 5. The multiplier 5 and delay circuit 6 perform a decoding process on the data differentially-coded by the transmitter. Therefore, the delay value of the delay circuit 6 is equal to the delay value used when data is differentially-coded by the transmitter. In this embodiment, the value is one chip of the PN code.

Figure 4A:
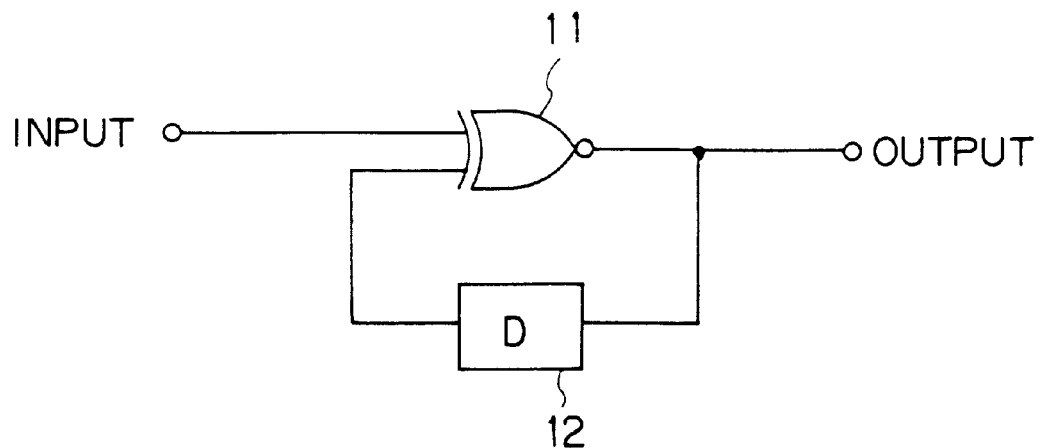
FIGS. 4A and 4B show the differential coding circuit and the decoding circuit. Particularly.
Figure 4B:
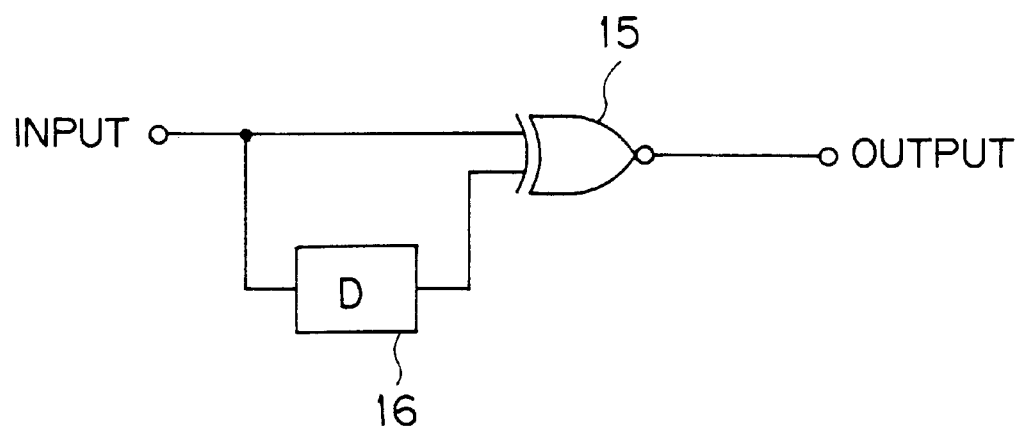

FIG. 4A shows the differential coding circuit of the transmitter. FIG. 4B shows the differential decoding circuit of the receiver. In the differential coding circuit, an input signal is input to one input terminal of an exclusive NOR circuit 11, and an output signal from the exclusive NOR circuit 11 is delayed by a delay circuit 12 and input to the other input terminal of the exclusive NOR circuit 11 as shown in FIG. 4A. In the differential decoding circuit, an input signal is input to one input terminal of an exclusive NOR circuit 15, and a signal which is generated from the input signal being delayed by a delay circuit 16 is input to the other input terminal of the exclusive NOR circuit 15 as shown in FIG. 4B. The exclusive NOR circuit 15 and the delay circuit 16 respectively correspond to the multiplier 5 and delay circuit 6 shown in FIG. 3. The exclusive NOR circuits 11 and 15 can be replaced with exclusive OR circuits.

In FIGS. 4A and 4B, the delay values of the delay circuits 12 and 16 should match each other. For example, the value is N (N is a natural number) times as large as 1 chip of the PN code. In this embodiment, the delay value of the delay circuits 12 and 16 is one chip of the PN code.

Returning back to FIG. 3, the PN code generation circuit 7 provides to the correlation circuit 8 the same pattern of PN code as the PN code multiplied by the transmitter. The correlation circuit 8 includes a matched filter. When it sequentially receives output signals from the multiplier 5, the synchronization of the phases of the PN codes is detected between the transmitter and the receiver at the timing at which the output signal indicates a peak value (detecting correlation). Then, the data obtained by multiplying the output signal from the multiplier 5 at the timing by the PN code is output as regenerated data. In this embodiment, the regenerated data is obtained by multiplying the output signal from the multiplier 5 by the PN code, but the data determining process described later can be performed to obtain the data.

Figure 5:
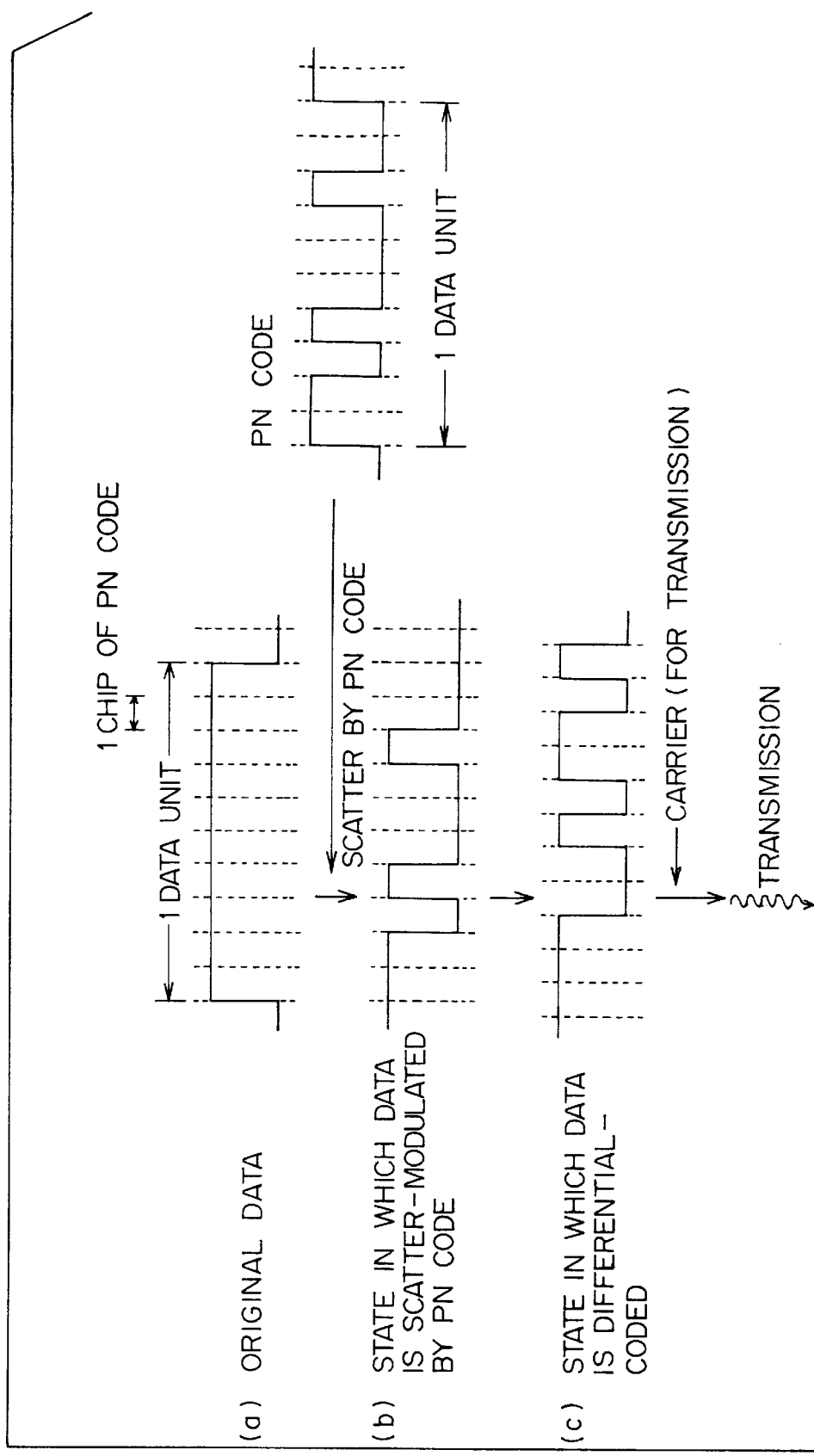
FIG. 5 shows the operation of the transmitter according to an embodiment of the present invention.
Figure 6:
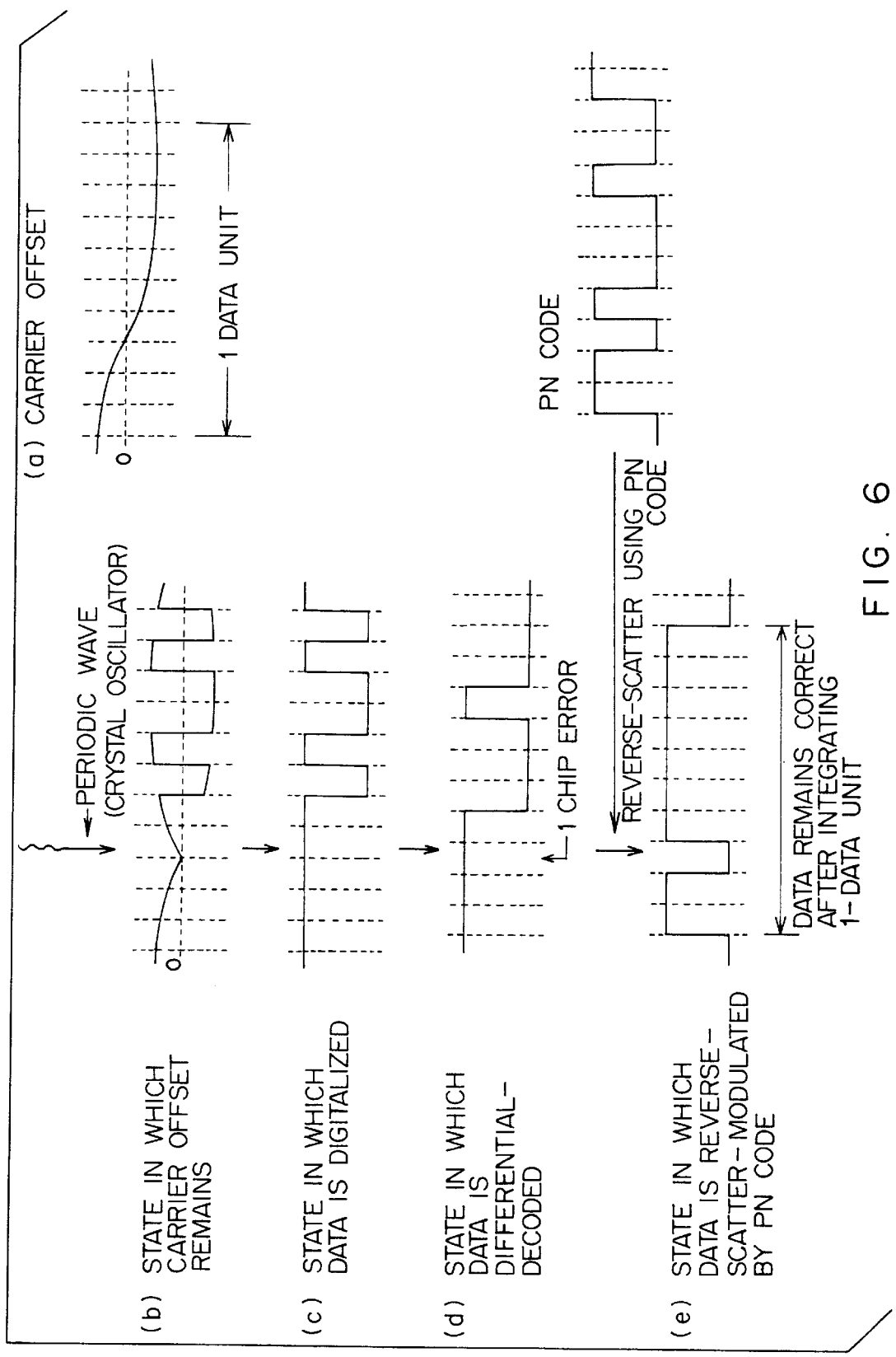
FIG. 6 shows the operation of the receiver according to an embodiment of the present invention.

Described below is the operation of the spread spectrum communications system according to the present embodiment. FIG. 5 shows the operations of the transmitter. FIG. 6 shows the operations of the receiver.

Part (a) in FIG. 5 indicates that the 1-bit data to be transferred (original data) is '1'. In this embodiment, 10 chips are assigned to the data of each bit when the data is spread using the PN code.

If the above described original data is multiplied by the PN code, then a spread-modulated state is entered as shown by part (b) in FIG. 5. Then, the data spread by the PN code is coded by the differential coding circuit shown in FIG. 4A. Part (c) in FIG. 5 shows the data in the coded state. The data in the state shown by part (c) in FIG. 5 is transmitted to the receiver on the carrier of 2.4 GHz.

When the receiver receives the data transferred on the carrier of 2.4 GHz from the transmitter, the multiplier 1 multiplies the received data by the periodic wave (carrier) generated by the crystal oscillator 2 to convert the frequency of the received data into the frequency around the base band. The periodic wave is generated by the crystal oscillator 2 independently of the carrier generated by the transmitter. Therefore, it may occur that the actual frequency of the carrier does not match the frequency of the periodic wave.

If these two frequencies do not match each other, the carrier offset remains as indicated by part (a) in FIG. 6 even if the received data is multiplied by the periodic wave. The frequency of the carrier offset equals the difference between the actual frequency of the carrier and the frequency of the periodic wave generated by the crystal oscillator 2. In the example indicated by part (a) in FIG. 6, the offset value turns from positive to negative between the third and the fourth chips from the left of the corresponding data bits. Therefore, in the multiplier 1, the output data obtained by multiplying the received data by the above described periodic wave is in the state indicated by part (b) in FIG. 6 if the carrier offset is in the state indicated by part (a) in FIG. 6.

The output data from the multiplier 1 is binarized (digitalized) by the limiter 4 after the noises, etc. are removed by the low-pass filter 3. The binarized data enters the state indicated by part (c) in FIG. 6. As compared with the data indicated by part (c) in FIG. 5, the data pattern shown in part (c) of FIG. 6 indicates the state in which the values of the fourth through the tenth chips from the left of the corresponding data bits are inverted by the carrier offset.

Next, when the output data from the limiter 4 is decoded by the differential decoding circuit shown in FIG. 4B, the data is set in the state indicated by part (d) in FIG. 6. If the decoded data pattern is compared with the data pattern indicated by part (b) in FIG. 5, an error value is detected in the third chip from the left of the corresponding data bits (1 mistaken for 0) as a result of the inversion of the carrier offset between the third and the fourth chips from the left of the corresponding data bits.

The correlation circuit 8 receives the decoded data, obtains the correlation between the PN code and each chip, and monitors the timing at which the output indicates the peak value (correlation detection). The peak value is detected using, for example, a matched filter. Then, it outputs the reverse-spreading-modulated data by multiplying the above described decoded data at the timing of the peak value by the PN code. The reverse-spreading-modulated data is in the state indicated by part (e) in FIG. 6.

The output data from the correlation circuit 8 should match the original data indicated by part (a) in FIG. 5 if the frequency of the carrier offset is 0 (no carrier offset). However, since there is a carrier offset indicated by part (a) in FIG. 6, the output data from the correlation circuit 8 does not match the original data, thereby generating a chip error. The number of erroneous chips in the output data from the correlation circuit 8 equals the number of times for which the carrier offset values are inverted between positive and negative. That is, when the values of the carrier offset are once inverted in the corresponding data bits as indicated by part (a) in FIG. 6, the output data from the correlation circuit 8 becomes erroneous in one chip as compared with the original chip.

Since the reverse-spreading-modulated data obtained by the multiplication by the PN code may, as described above, contain an error chip, a data determination process is performed. The processes performed by the data determination unit are described below by referring to FIGS. 7A and 7B. The data determination unit is provided in, for example, the correlation circuit 8 shown in FIG. 3.

Figure 7:
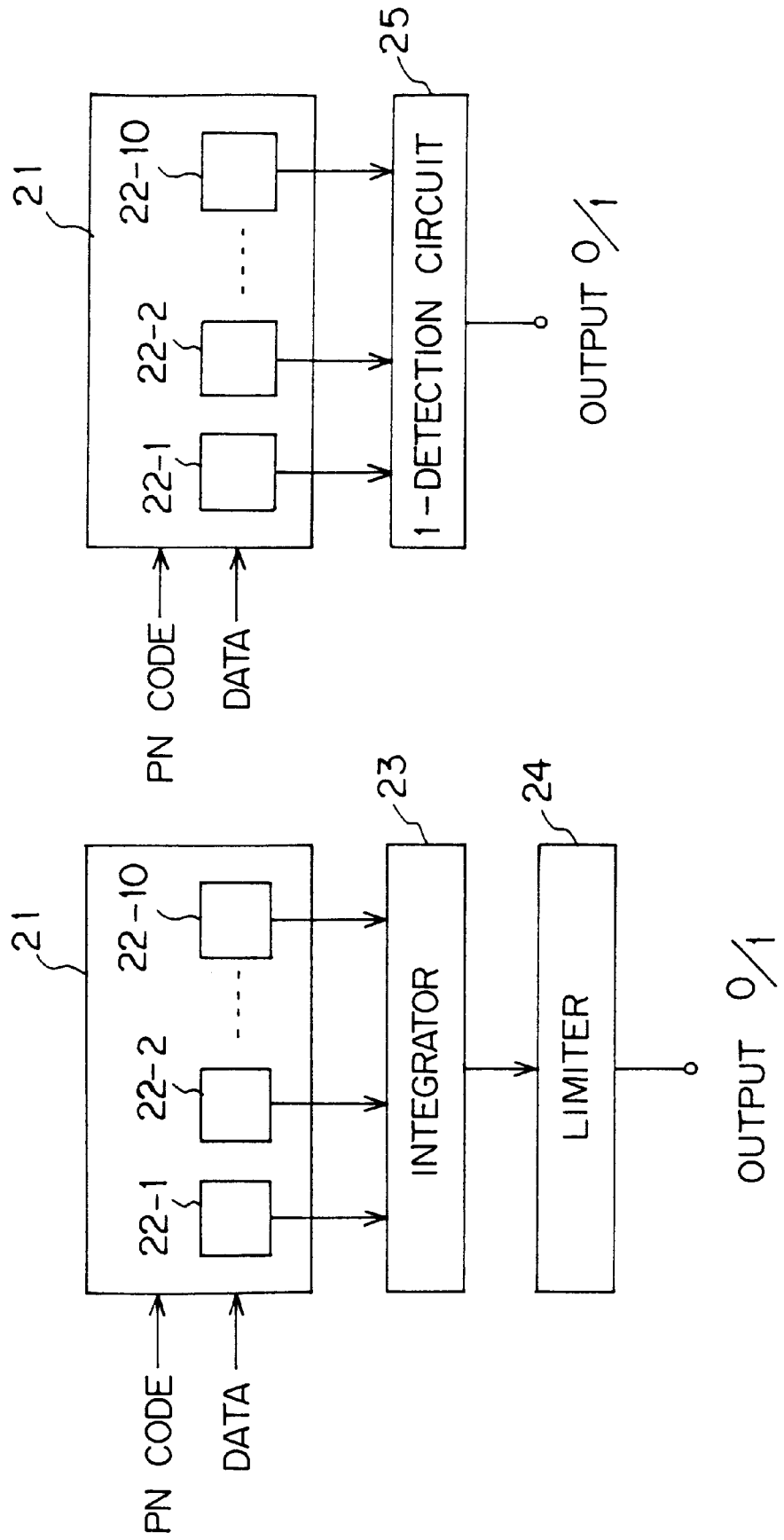
FIGS. 7A and 7B are block diagrams showing the data determination unit of the receiver according to an embodiment of the present invention.

FIG. 7A is a block diagram showing the configuration of the first embodiment of the data determination unit. The correlation unit 21 monitors the correlation between the PN code and the received data, and stores the products of these data in the data holding circuits 22-1 through 22-10 for each chip. The data holding circuits 22-1 through 22-10 comprise flipflop circuits, and the number of these data holding circuits is equal to the number of the chips of the PN codes assigned to each bit of the transfer data. When the correlation between the PN code and the received data is detected, the data stored in the data holding circuits 22-1 through 22-10 is transferred to the integration circuit 23.

The integration circuit 23 integrates the transferred data, and notifies the limiter 24 of the integrated value. A predetermined limit value is set in the limiter 24, and the limiter 24 compares the integrated value with the limit value. If the integrated value is larger, the value of the corresponding data bit is assumed to be 1, and outputs 1 as the regenerated value of the transfer data from the transmitter. If the integrated value is smaller, the value of the corresponding data bit is assumed to be 0, and outputs 0 as the regenerated data value.

FIG. 7B is a block diagram showing the configuration of another embodiment of the data determination unit. In FIG. 7B, when the correlation unit 21 detects the correlation between the PN code and the received data, it immediately transfers the data stored in the data holding circuits 22-1 through 22-10 to a 1-detection circuit 25. The 1-detection circuit 25 counts the number of is (number of chips indicating 1) contained in the transferred data, and compares the number of 1s with half of the number of the chips of the PN codes assigned to each bit of the transfer data. In the above described example, since 10 chips are assigned to each bit of the transfer data, the 1-detection circuit 25 checks whether or not the number of 1s contained in the transferred data is equal to or larger than 5. If the number of 1s is equal to or larger than 5, then the corresponding data bit value is assumed to be 1, and the 1-detection circuit 25 outputs 1 as the value of the regenerated transfer data from the transmitter. If the number of 1s is smaller than 5, then the corresponding data bit value is assumed to be 0, and the 1-detection circuit 25 outputs 0.

In the examples shown in FIGS. 5 and 6, the data in the state indicated by part (e) in FIG. 6 is input to the 1-detection circuit 25. In this example, there are 9 chips indicating 1 and one chip indicating 0. Therefore, the value of the corresponding data bit is assumed to be 1, and 1 is output as the regenerated data of the corresponding data bit. Thus, the original data can be correctly regenerated even if a chip error occurs.

The method of detecting the correlation using a digital matched filter and regenerating data is described below by referring to FIGS. 8 through 10.

Figure 8:
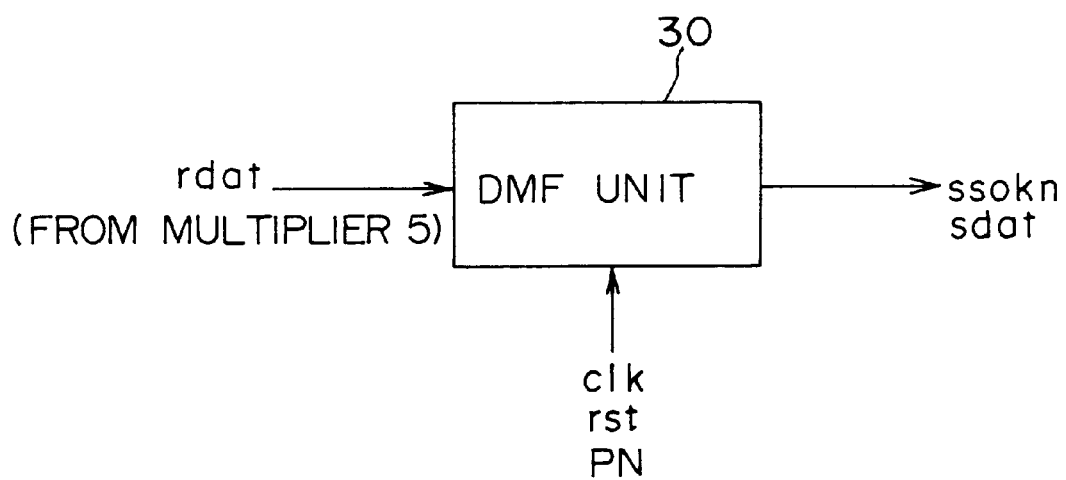
FIG. 8 shows the concept of the input and output of the digital matched filter unit (DMF)

FIG. 8 shows the concept of the input/output of a digital matched filter unit (DMF) 30. The data (rdat) multiplied by the multiplier 5, the PN code (PN) generated by the PN code generation circuit 7, a reset signal (rst), and a clock (clk) are input to the digital matched filter unit 30. The digital matched filter unit 30 outputs a correlation value (ssokn) and regenerated data (sdat). The digital matched filter unit 30 corresponds to the correlation circuit 8 shown in FIG. 3.

Figure 9:
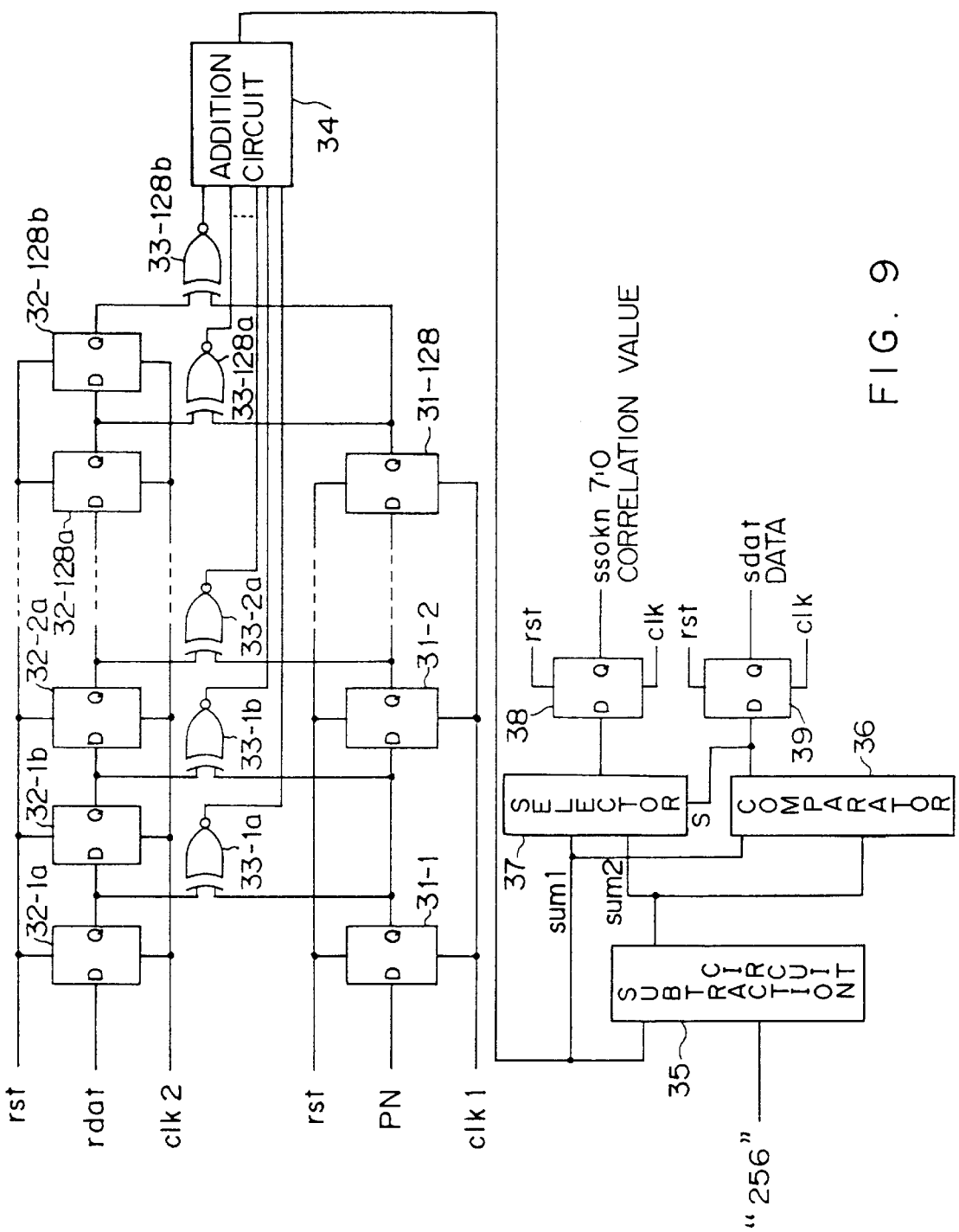
FIG. 9 shows the circuit of the digital matched filter unit.

FIG. 9 shows the circuit of the digital matched filter unit 30. In FIG. 9, 128 chips are assigned to 1-bit transfer data, and a double-oversampling system is adopted to increase the precision in correlation detection.

Flipflops 31-1, . . . , 31-128 (a total of 128 flipflops) are a flipflop group for storing the PN codes generated by the PN code generation circuit 7. The Q output of flipflop 31-$i$ is input to the D terminal of flipflop 31-$i$+1. The PN code provided for the D terminal of flipflop 31-1 is shifted column by column according to the clock clk1. When the 128-chip PN code is completely stored, the clock stops and the resultant value is stored.

Flipflops 32-1$a$, 32-1$b$, . . . , 32-128$a$, 32-128$b$ (a total of 256 flipflops) are a flipflop group for storing data rdat. The Q output of each flipflop is input to the D terminal of the subsequent flipflop. The data rdat provided for the D terminal of flipflop 32-1$a$ is shifted column by column according to the clock clk2. The frequency of the clock clk2 is double the frequency of the PN code (clock frequency of a chip) for double-oversampling. For example, when the data transfer speed is 64 kbps, the frequency is 0.064×128×2=16.384 MHz.

The Q output of each of the flipflops 32-$ja$ and 32-$jb$ is input to one terminal of each of exclusive NOR circuits 33-$ja$ and 33-$jb$. The Q output of flipflop 31-$i$ is input to the other terminal of the exclusive NOR circuit 33-$ja$. Each output from the exclusive NOR circuits 33-1$a$, 33-1$b$, . . . , 33-128$a$, and 33-128$b$ (a total of 256 circuits) is input to an addition circuit 34.

The addition circuit 34 adds the logical values output from exclusive NOR circuits 33-1$a$, 33-1$b$, . . . , 33-128$a$, and 33-128$b$. That is, the number of NOR circuits that outputs 1 is obtained.

The sum1 computed by the addition circuit 34 is input to a subtraction circuit 35, a comparator 36 and a selector 37. The subtraction circuit 35 obtains sum2=256−sum1, and outputs sum2 to the comparator 36 and the selector 37.

The comparator 36 compares sum1 with sum2, outputs 1 when sum1 is larger than sum2, and outputs 0 when sum1 is equal to or smaller than sum2. The selector 37 outputs sum1 when the output value of the comparator 36 is 1, and outputs sum2 when the output value of the comparator 36 is 0.

A flipflop 38 outputs the output value from the selector 37 as a correlation value ssokn. A flipflop 39 outputs the output value from the comparator 36 as the data sdat.

The data rdat is sequentially shifted according to the clock clk2 in the above described digital matched filter unit. The regeneration timing of data is detected by checking the correlation between the data rdat and the PN code at each timing. Described below is the method of detecting the correlation and regenerating the data.

Assume that the data rdat and the PN code completely match each other (the values of the corresponding chips are equal) at a specific timing. In this case, the value held in flipflop 31-1 is equal to the value held in flipflops 32-1$a$ and 32-1$b$. Therefore, the outputs from exclusive NOR circuits 33-1$a$ and 33-1$b$ are 1. Similarly, each of the outputs from exclusive NOR circuits 33-2$a$, 33-2$b$, . . ., 33-128$a$, and 33-128$b$ is also 1. As a result, the sum1 output by the addition circuit 34 is 256. When the sum1 is 256, the value of the sum2 is 0. Accordingly, the comparator 36 outputs 1, and the selector 37 outputs 256. The flipflop 38 outputs 256 as the correlation value ssokn, and the flipflop 39 outputs 1 as the data sdat.

Assume that the value of each chip of the data rdat and the PN code is different from each other. In this case, each of the outputs from exclusive NOR circuit 33-1$a$, 33-1$b$, . . . , 33-128$a$, and 33-128$b$ is 0. As a result, the sum1 output by the addition circuit 34 is 0. When the sum1 is 0, the value of the sum2 is 256, the comparator 36 outputs 0, the selector 37 outputs 256, the flipflop 38 outputs 256 as the correlation value ssokn, and the flipflop 39 output 0 as the data sdat.

The above mentioned two examples indicate the output values obtained when the data is regenerated in the case where the transfer data 1 and 0 are transferred without being inverted in a chip unit by a carrier offset, etc. At this time, the correlation value ssokn indicates the maximum value (256). If the data is inverted in a chip unit by a carrier offset, etc., then the correlation value ssokn is not 256. However, if the frequency of the carrier offset is considerably smaller than the frequency of the PN code, then the correlation value ssokn is nearly 256. If the frequency of the carrier offset is considerably smaller than the frequency of the PN code, then the data sdat is correctly regenerated as the transfer data 1 and 0.

At a timing other than the timing at which the data should be regenerated, the correlation between the data rdat and the PN code is rather low. Therefore, the outputs of exclusive NOR circuits 33-1$a$, 33-1$b$, . . . , 33-128$a$, and 33-128$b$ indicates 1 and 0 at random. Therefore, the sum1 output from the addition circuit 34 is an intermediate value between 0 and 256. As a result, the correlation value ssokn is nearly 128 (the minimum value is 128).

Thus, the correlation value ssokn indicates the correlation between the data rdat and the PN code. Using the correlation value ssokn, the timing at which the regenerated data is retrieved can be determined. That is, the value of the data sdat at the timing at which the correlation value ssokn is nearly 256 is defined as the regenerated data of the data transferred from the transmitting equipment.

With the above described configuration, the correlation between the data rdat and the PN code can be detected, and the regenerated data can be simultaneously output.

With the configuration shown in FIG. 9, the circuits for performing logical operations on the signals from flipflops 31-1, . . . , 31-128 and the signals from flipflops 32-1$a$, 32-1$b$, . . . , 32-128$a$, and 32-128$b$ (a total of 256 flipflops) are realized by exclusive NOR circuits 33-1$a$, 33-1$b$, . . . , 33-128$a$, and 33-128$b$. These circuits can also be formed by exclusive OR circuits. In this case, only a small modification should be made to the processes of and after the addition circuit 34 in the configuration shown in FIG. 9.

Figure 10:
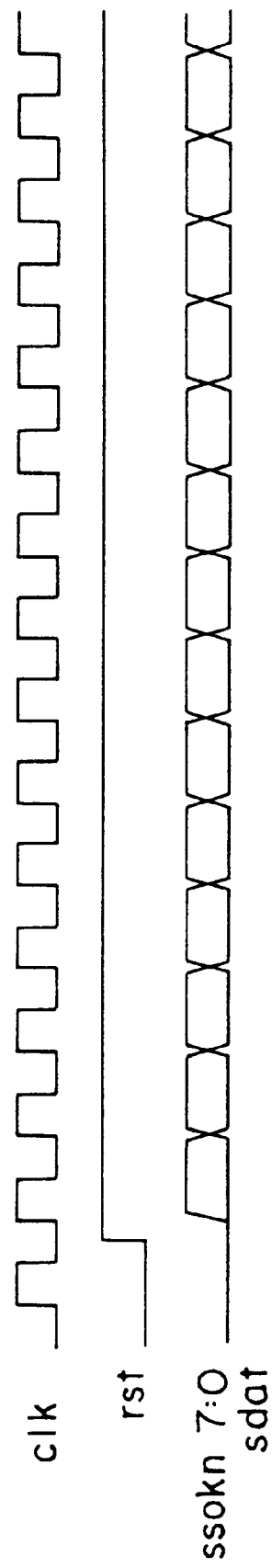
FIG. 10 is a timing chart showing the operation of the digital matched filter unit.

FIG. 10 is a timing chart of the digital matched filter unit 30. As shown in FIG. 10, the correlation value ssokn and the data sdat are output at each leading edge of the clock after an output is reset.

As described above, the carrier regeneration is not required in the receiver of the spread spectrum communications system according to the present embodiment. Therefore, there are a smaller number of analog process circuits as compared with the conventional synchronous detection circuit, thereby generating a smaller circuit and reducing the total cost by removing the VCO.

Since the received data is multiplied by the periodic wave having the frequency almost equal to that of the carrier, the frequency can be directly demodulated from the frequency band of the carrier to the base band without providing the IF circuit.

Furthermore, the received data is binarized using the limiter 4, and the subsequent processes can be performed as digital processes. Therefore, the precision required in analog circuits is not required any more. That is, for example, it is not necessary to set the delay value of the delay circuit 6 as exactly one chip, but it can be set as approximately one chip when a differential decoding process is performed on one chip using the multiplier 5 and the delay circuit 6. Additionally, the frequency of the periodic wave output from the crystal oscillator 2 can be the frequency approximately equal to that of the actual carrier. In this case, the carrier offset indicated by part (a) in FIG. 4 may be generated and a chip error may occur in the regenerated data in the receiving equipment, that is, the regenerated data is different from the original data from the transmitting equipment, unless the frequencies completely match each other. However, the transfer data can be correctly regenerated since the data determination unit, the differential-coding circuit and the differential-decoding circuit are provided.

The data may not be correctly regenerated depending on the correlation between the frequency of the PN code and the frequency of the carrier offset. The frequency of the PN code refers to the number of chips per second. For example, assuming that the data transmission speed is 64 kbps and 128 chips are assigned to each bit, the frequency of the PN code (clock frequency of a chip) is 0.064×128=8.192 MHz. In this case, the frequency of the carrier offset, that is, the differential frequency between the actual carrier frequency and the frequency of the periodic wave output from the crystal oscillator 2 can be up to approximately 2 MHz.

This is explained as follows. That is, a chip error occurs when the value of the carrier offset is inverted. The number of chip errors is equal to the number of times of the inversion of the value of the carrier offset. Therefore, assuming that the frequency of the PN code is four or more times the frequency of the carrier offset, the number of chip errors occurring in specific data bits is smaller than half the number of chips assigned to each bit. Therefore, the original data can be correctly regenerated by the processes performed by the data determination unit as shown in FIGS. 7A and 7B.

That is, if the data transmission speed and the number of chips to be assigned to each data bit are determined, then the permitted allowance of the error of the frequency of the carrier offset which satisfies the above described conditions is determined based on the actual carrier. Therefore, the frequency of the periodic wave output by the crystal oscillator 2 only has to be approximately equal to the carrier frequency, and no strict conditions are placed on the frequency. Therefore, the reliability of the circuit is improved, and inexpensive general-purpose parts can be used.

The circuit for performing the above described digital process can be realized as a 1-chip IC which is light in weight, small in size, and is easily assembled. Furthermore, the circuit which conventionally performs an analog process can perform a digital process, thereby improving the anti-noise characteristics.

In the above described embodiment, the integration circuit 23, limiter 24, and 1-detection circuit 25 are provided to compensate data errors as shown in FIGS. 7A and 7B. In this case, if there are only a small number of data errors held by data holding circuits 22-1 through 22-10, the data errors can be compensated in the system. However, if there are a large number of chips containing errors, then the data 1 is mis-recognized as 0. Especially when bit errors burst out (over a large number of chips), the data 1 is replaced with 0 over a large number of bits. In this case, the data cannot be correctly received. Particularly in the receiving equipment, it is necessary to multiply the periodic wave having a frequency equal to the frequency of the carrier generated by the transmitter by an equal phase. However, since the carrier and the periodic wave are independently generated in the receiving and transmitting equipments, it is hard to completely unify the frequency and the phase in these equipments. Therefore, it is not practical to use a complicated circuit to multiply a received signal by a periodic wave using a frequency and a phase equal to those of the carrier. As a result, a practical system needs to correctly receive data with the carrier and the periodic wave having a little different frequencies and phases.

Figure 11A:
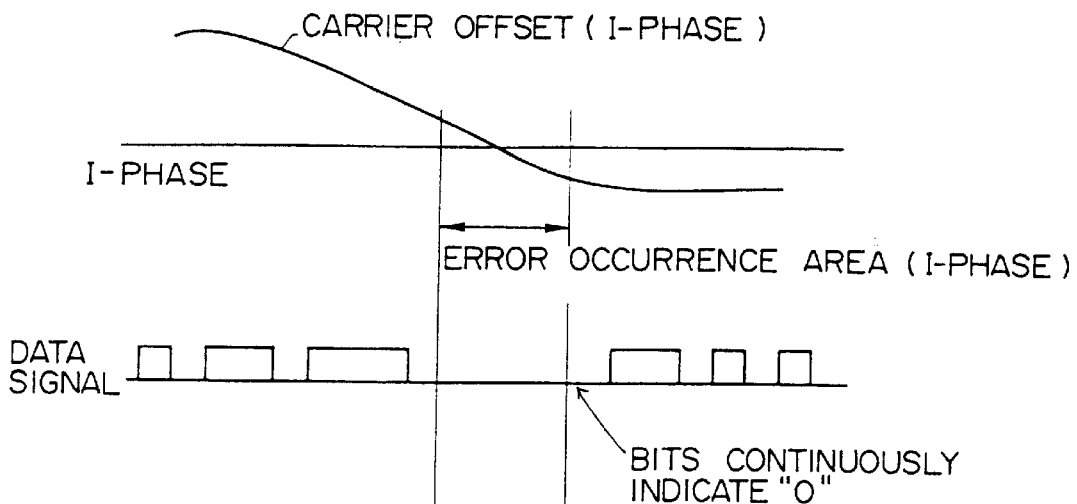
FIGS. 11A and 11B show the principle of another aspect of the receiver according to the present invention.
Figure 11B:
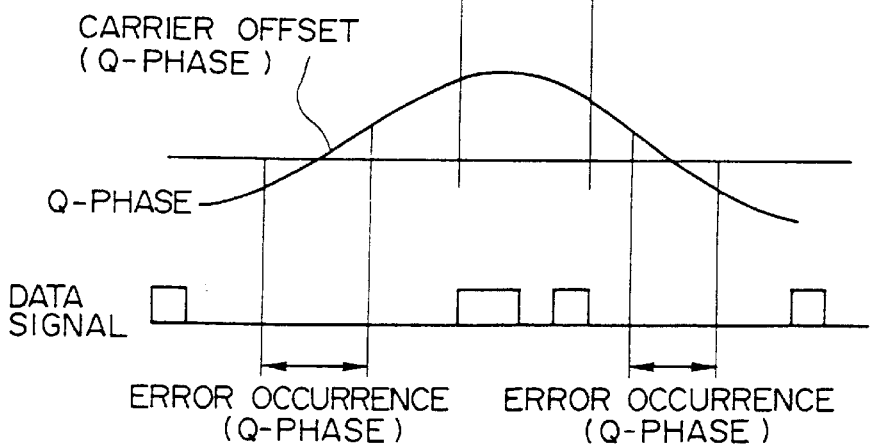

If a carrier and a periodic wave are a little different in frequency, a received signal is not completely at the base band, but generates a carrier offset from the frequency difference between the carrier and the periodic wave as described above. In the above described embodiment, the bit errors can be reduced even if the carrier offset changes the polarity as described by referring to FIGS. 5 and 6. However, when the carrier offset actually changes from positive to negative or from negative to positive, the amplitude of the carrier becomes extremely small, thereby generating a burst of bit errors. FIGS. 11A and 11B show the principle of another aspect of the receiver according to the present invention. In the receiver according to the aspect described below, two periodic waves are generated with frequencies approximately equal to that of the carrier and the phases shifted by 90 degree between them. The signal transferred on the carrier from the transmitting equipment is separately multiplied by the two periodic waves. In this example, the periodic wave having a frequency and a phase equal to those of the carrier is normally called an I-phase wave, and the periodic wave having a 90-degree-shifted phase from the I-phase wave is called a Q-phase wave. Since the periodic waves having the phases shifted by 90 degrees from each other are also used in the below described aspect of the present invention, these waves are referred to as the I-phase wave and the Q-phase wave for convenience. However, according to the present embodiment, the I-phase and the Q-phase are generated in the receiver independently of the carrier. Therefore, the phases do not always match each other between the carrier and the I-phase wave.

FIG. 11A shows an example of a signal obtained by multiplying the received signal by the I-phase wave. In this example, a carrier offset is generated by the frequencies of the carrier and the I-phase wave. For example, if the carrier is $\cos \omega_0 t$ and multiplied by the periodic wave $\cos (\omega_0+\delta)t$ having a frequency a little different from the frequency of the carrier, then the following equation (1) stands.

$$V = a(t)\cos\omega_0 t \cdot \cos(\omega_0 + \delta)t \quad (1)$$
$$= \frac{1}{2}a(t)\{\cos(2\omega_0 + \delta)t + \cos\delta t\}$$
$$= \frac{1}{2}a(t)\cos(2\omega_0 + \delta)t + \frac{1}{2}a(t)\cos\delta t$$

If the signal passes through the low-pass filter to remove the double frequency elements, equation (1) is expressed as follows.

$$V = \frac{1}{2}a(t)\cos\delta t \quad (2)$$

where a(t) indicates a signal at the base band. As indicated by equation (2) above, $\cos \delta t$ remains as a carrier offset element. The point where the carrier offset indicates zero, that is, when $\delta t \approx N\pi/2$ (N indicates an odd number), a burst of bit errors occur as shown in FIG. 11A.

When the amplitude of the carrier offset is large, no bit errors occur. As shown in FIG. 11B, the carrier is multiplied by the periodic wave having a frequency equal to that of the I-phase wave and a phase shifted by 90 degrees from the phase of the I-phase wave. The periodic wave having a phase shifted by 90 degrees from the phase of the I-phase wave is referred to as a Q-phase wave. This corresponds to the process of multiplying the carrier by sin $(\omega_0+\delta)t$ instead of cos $(\omega_0+\delta)t$ in the example above. In this process, the computation expressed by the above equation can be performed as follows.

$$V = \frac{1}{2}a(t)\sin\delta t \quad (3)$$

FIG. 11B shows the values obtained by equation (3). When the carrier is multiplied by the I-phase wave as shown in FIGS. 11A and 11B, the carrier offset indicates the maximum value if the carrier is multiplied by the Q-phase wave with the carrier offset of nearly zero. Therefore, correct data can be obtained by retrieving data from the signal obtained through the multiplication by the Q-phase shown in FIG. 11B when a burst of bit errors occur as shown in FIG. 11A, and by retrieving data from the signal obtained through the multiplication by the I-phase shown in FIG. 11A when a burst of bit errors occur as shown in FIG. 11B.

Figure 12:
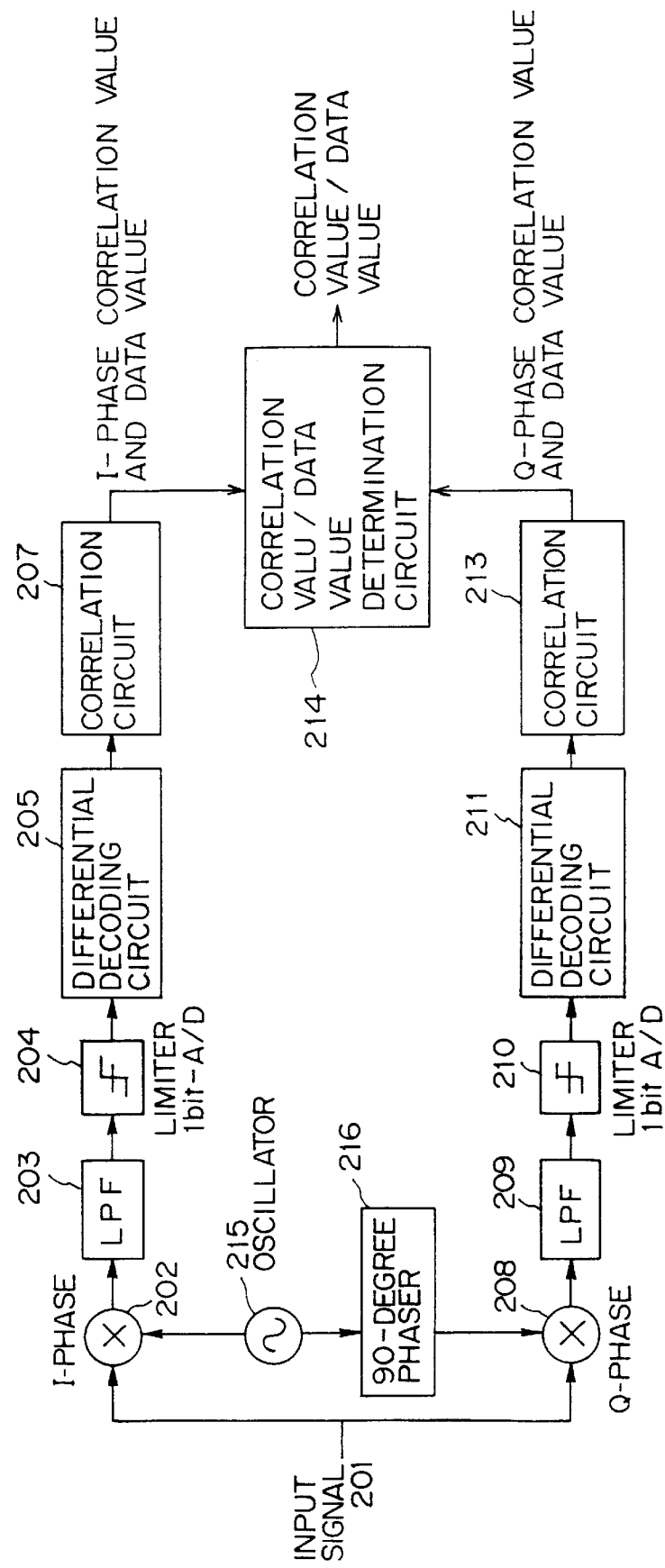
FIG. 12 is a block diagram showing the central configuration according to another embodiment of the receiver in the spread spectrum communications system to which the principle shown in FIGS. 11A and 11B is applied.

FIG. 12 is a block diagram showing the configuration of the central parts according to another embodiment of the receiver in the spread spectrum communications system to which the principle shown in FIGS. 11A and 11B is applied.

The signal received from the transmitter is input to the receiver of the present embodiment as an input signal 201. The input signal 201 is divided and input to multipliers 202 and 208. The multiplier 202 multiplies the input signal 201 by the periodic wave oscillated by an oscillator 215.

The periodic wave generated by the oscillator 215 has a frequency approximately equal to that of the carrier of the input signal, and the input signal is multiplied by the periodic wave. The periodic wave generated by the oscillator 215 is not regenerated from the carrier, but is independently generated by the oscillator 215. Therefore, it has a frequency a little different from that of the carrier as described above. The periodic wave oscillated by the oscillator 215 is referred to as an I-phase wave.

The periodic wave output from the oscillator 215 is shifted in phase by 90 degrees by a phaser 216 and input to the multiplier 208. The 90-degree-shifted periodic wave is referred to as a Q-phase wave. The multiplier 208 multiplies the input signal 201 by the Q-phase wave and is provided for a low-pass filter 209.

Low-pass filters 203 and 209 remove the double frequency element of the carrier from the signal obtained by multiplying the input signal 201 by the I-phase wave and the input signal 201 by the Q-phase wave, and extract signals returned closely to the base band.

Next, the signals output from the low-pass filters 203 and 209 are input to limiters 204 and 210, and converted into digital signals containing 1 and 0. As described above by referring to FIGS. 11A and 11B, the signal, close to the base band, obtained by multiplying the input signal 201 by the I-phase wave is 90 degrees different in phase at the point where the carrier offset is 0 from the signal, close to the base band, obtained by multiplying the input signal 201 by the Q-phase wave.

The digital signal output from the limiters 204 and 210 are input to differential decoding circuits 205 and 211, assigned a predetermined (for example, 1-chip) delay by the delay circuit, processed in a logical operation using the digital signals output from the limiters 204 and 210, and differential-decoded. The differential decoding circuit corresponds to the circuit described above by referring to FIG. 4B.

The differential-decoded signals are input to correlation circuits 207 and 213. The correlation circuits 207 and 213 multiply the signals by a predetermined PN code, outputs the correlation value and the data value, and inputs them to a correlation value/data value determination circuit 214. The correlation value output from the correlation circuit 207 is referred to as an I-phase correlation value, and the correlation value output from the correlation circuit 213 is referred to as a Q-phase correlation value.

The correlation value/data value determination circuit 214 compares the I-phase correlation value with the Q-phase correlation value, and outputs as a received data value the data value of the phase whichever indicates a larger correlation value. Otherwise, it adds up the I-phase correlation value and the Q-phase correlation value, and outputs a data value based on the sum of the correlation values.

The correlation value/data value determination circuit 214 is described below in detail.

Figure 13:
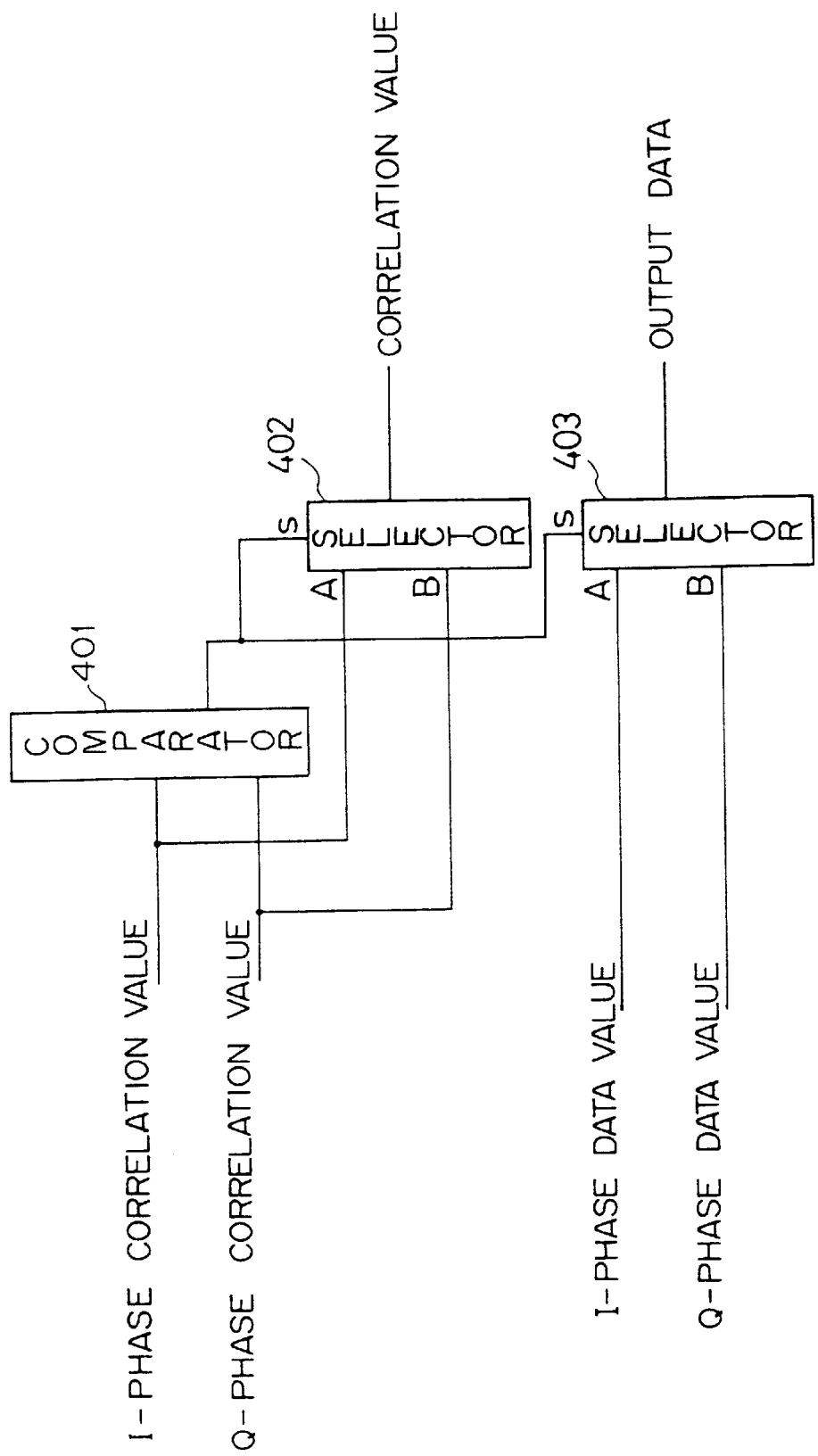
FIG. 13 shows an example of the configuration of the correlation value/data value determination circuit.

Two correlation circuits as shown in FIG. 9 are provided respectively for the I- and Q-phases in FIG. 13 to output the I-phase correlation value and the I-phase data value, and the Q-phase correlation value and the Q-phase data value respectively.

FIG. 13 shows an example of the configuration of the correlation value/data value determination circuit. In FIG. 13, the clock and the reset signal are omitted.

The circuit shown in FIG. 13 receives the I-phase correlation value and the I-phase data value from the correlation circuit 207 shown in FIG. 12, and also receives the Q-phase correlation value and the Q-phase data value from the correlation circuit 213.

The I-phase correlation value is input to a comparator 401 and the A terminal of a selector 402. Similarly, the Q-phase correlation value is input to the comparator 401 and the B terminal of the selector 402.

The I-phase data value from the correlation circuit 207 is input to the A terminal of a selector 403, and the Q-phase data value from the correlation circuit 213 is input to the B terminal of the selector 403.

The I-phase correlation value and the Q-phase correlation value are input to the comparator 401. The comparator 401 compares these correlation values, determines a larger value, and inputs to the S terminals of the selectors 402 and 403 the signal instructing which input from the terminal of the selector 402 or the selector 403 should be output. It also stores the larger correlation value, and outputs a correlation value according to the clock signal not shown in FIG. 13.

The selectors 402 and 403 selects and outputs either the I-phase correlation value and the I-phase data value or the Q-phase correlation value and the Q-phase data value as a correlation value and output data according to the instruction signal input from the comparator 401.

Thus, with the configuration of the circuit shown in FIG. 13, the correlation value/data value determination circuit is designed to compare the I-phase correlation value with the Q-phase correlation value and obtain the data of a phase having larger correlation value. A burst of bit errors may occur around the point where the carrier offset turns the polarity. But even if such a burst of bit errors occur on one phase, a correct data value can be obtained because the data is retrieved from either the I-phase or the Q-phase whichever indicates correct data bits.

That is, as described by referring to FIGS. 11A and 11B, the I-phase correlation value becomes smaller at a point where a burst of bit errors occur in the I-phase. At this time, the Q-phase correlation value is large in the Q-phase. Therefore, the Q-phase data value is retrieved to obtain correct data. Similarly, the Q-phase correlation value becomes smaller at a point where a burst of bit errors occur in the Q-phase. Therefore, the I-phase data value is retrieved to obtain correct data.

Figure 14:
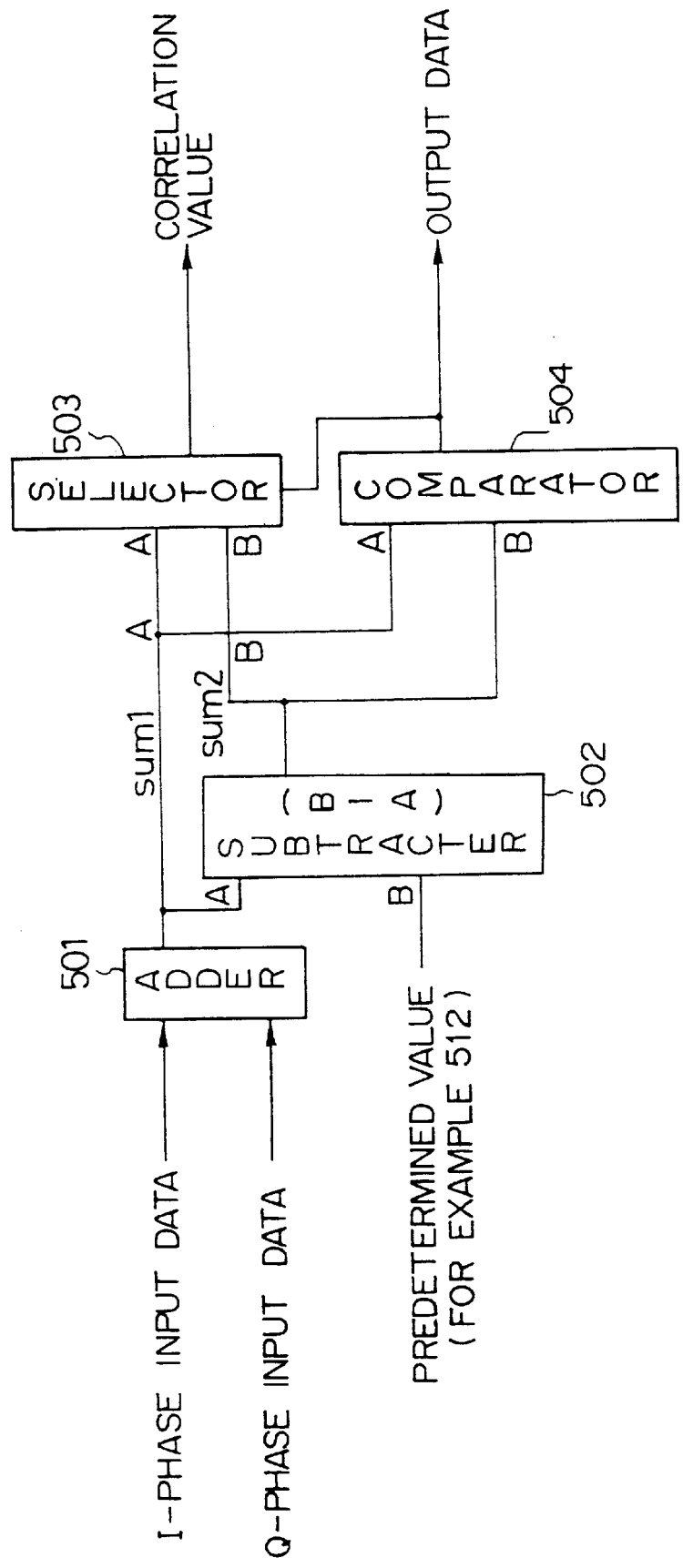
FIG. 14 shows another example of the configuration of the correlation value/data value determination circuit.

FIG. 14 shows another example of the configuration of the correlation value/data value determination circuit.

With the configuration shown in FIG. 14, a data value is not obtained from either the I-phase correlation value or the Q-phase correlation value whichever is larger, but the output from the addition circuit 34 of the digital matched filter shown in FIG. 9 is input as the outputs from the correlation circuits 207 and 213 to an adder 501 on the I-phase and the Q-phase. That is, the I-phase input data shown in FIG. 14 indicates the output from the addition circuit 34 of the correlation circuit 207 provided in the I-phase equipment, and the Q-phase input data indicates the output from the addition circuit 34 of the correlation circuit 213 provided in the Q-phase equipment.

The adder 501 adds up the I-phase input data value and the Q-phase input data value. This refers to adding up the I-phase correlation value and the Q-phase correlation value. The output from the adder 501 is sum1, and input to the A terminal of a subtracter 502. A predetermined value is input to the B terminal of the subtracter 502. The predetermined value is set to, for example, 512 that is the maximum value of the sum of the outputs from the I-phase and Q-phase correlation circuits when the correlation circuit is configured as shown in FIG. 9 and a total of 256 exclusive NOR circuits are provided.

The subtracter 502 subtracts the sum1 from a predetermined value (for example, 512) and obtains the difference sum2. The operations of the subtracter 502, a selector 503, and a comparator 504 are the same, respectively as the operations of the subtraction circuit 35, the selector 37, and the comparator 36 in FIG. 9.

That is, the comparator 504 compares the sum1 with the sum2, outputs 1 when the sum1 is larger than the sum2, and outputs 0 when the sum2 is equal to or larger than the sum1. The selector 503 outputs the sum1 when the output value from the comparator 504 is 1, and outputs the sum2 when the output value from the comparator 504 is 0.

If the input data completely matches the PN code (each chip has an equal value) at a specific timing, then the sum1 of the adder 501 is 512. When the sum1 is 512, the value of the sum2 is 0 and the comparator 504 outputs the output data of 1. The selector 503 outputs 512 as a correlation value.

When the values of the chips of the input data and the PN codes are different from one another, the sum1 output from the adder 501 is 0. At this time, the value of sum2 is 512, the comparator 504 outputs 0 as output data, and the selector 503 outputs 512 as a correlation value.

Thus, a burst of bit errors can be effectively processed using the sum of the outputs of the exclusive NORs of the I-phase and the Q-phase. However, a more effective method is to use the data value of either the I-phase correlation value or the Q-phase correlation value whichever indicates a larger correlation value as shown in FIG. 13.

In the explanation of the above described embodiment, the I-phase wave whose phase is nearly equal to the phase of the carrier and the Q-phase wave whose phase is different by 90 degrees from the I-phase wave are described. However, the phase difference between the Q-phase wave and the I-phase wave is not limited to 90 degrees, but any periodic wave can be accepted if its phase is to generate a carrier offset having an amplitude large enough to suppress a burst of bit errors at the point where the carrier offset generated by the multiplication of the I-phase wave changes the polarity.

The above described digital matched filter has a 128-chip PN code and performs a double oversampling, but is not limited to such applications. The number of the chips of the PN code can be set to an optional number depending on the design, and the double oversampling process is not always required.

According to the present invention, the receiver does not have to regenerate a carrier. Therefore, the entire circuit can be smaller in size and a low-cost system can be realized.

Since most processes of retrieving the original data from the data spread by the PN codes are performed in a digital format, the circuit can be furthermore smaller. As a result, strict precision requirements for analog values can be removed, thereby considerably improving the reliability of the circuit operations.

Correct data can be obtained without bit errors by multiplying a signal by a periodic wave having a phase different from that of the I-phase, not only by multiplying the signal transmitted from the transmitting equipment by the I-phase wave having the phase nearly equal to that of the carrier but also by multiplying the signal by the periodic wave having a phase different from that of the I-phase, even if a burst of bit errors occur from a reduced amplitude at the point where the carrier offset of the signal obtained as a result of the multiplication by the I-phase wave changes the polarity.

Thus, the reliability of the spread spectrum communications system can be improved and a practical receiver can be successfully implemented.

What is claimed is:

1. A receiver for use in a spread spectrum communications system using a spreading code of a predetermined pattern in data transfer, comprising:

oscillation means for outputting a periodic wave having a predetermined frequency;

multiplication means for receiving differential-coded data and multiplying the received data by the periodic wave output by said oscillation means;

binarization means for binarizing an output from said multiplication means;

decoding means for differential-decoding an output from said binarization means using a delay circuit;

correlation means for obtaining correlation between data decoded by said decoding means and the spreading code; and data determination means for determining a digital value by comparing a number of chips indicating 0 and a number of chips indicating 1 in data input to said correlation means when the correlation is obtained by said correlation means.

2. A spread spectrum communications system for transferring data on a carrier having a predetermined frequency between a transmitter and a receiver using a spreading code of a predetermined pattern in data transfer, said receiver comprising:

oscillation means for outputting a periodic wave having a predetermined frequency;

multiplication means for multiplying the periodic wave output from said oscillation means by differential-coded data transmitted from the transmitter;

binarization means for binarizing an output from said multiplication means;

decoding means for differential-decoding an output from said binarization means by using a delay circuit;

correlation means for obtaining correlation between differential-decoded data by said decoding means and the spreading code; and data determination means for determining a digital value by comparing a number of chips indicating 0 and a number of chips indicating 1 in data input to said correlation means when the correlation is obtained by said correlation means, wherein a frequency of the spreading code is four or more times a difference between the frequency of the carrier and the frequency of the periodic wave.

3. A spread spectrum communications system according to claim 2, wherein

N chips (N indicates a natural number) of the spreading code is used as a delay value in said differential-coding and decoding.

4. A receiver for use in a spread spectrum communications system for transmitting and receiving a spread-modulated base band signal on a carrier, comprising:

an oscillator for generating a first periodic wave having a frequency approximately equal to that of the carrier;

phaser means for generating a second periodic wave by altering a phase of the first periodic wave;

first demodulation means for demodulating a signal by multiplying the signal on the carrier by the first periodic wave, obtaining correlation between a spreading code and the signal multiplied by the first periodic wave and transmitting a first correlation value to data value determination means;

second demodulation means for demodulating a signal by multiplying the signal on the carrier by the second periodic wave, obtaining correlation between the spreading code and the signal multiplied by the second periodic wave and transmitting a second correlation value to said data value determination means; and said data value determination means for receiving a signal demodulated by said first demodulation means and a signal demodulated by said second demodulation means, comparing the first correlation value with the second correlation value, outputting a data value obtained from the signal multiplied by the first periodic wave when the first correlation value is larger than the second correlation value, and outputting a data value obtained from the signal multiplied by the second periodic wave when the second correlation value is larger than the first correlation value.

5. A receiver for use in a spread spectrum communications system for transmitting and receiving a spread-modulated base band signal on a carrier, comprising:

an oscillator for generating a first periodic wave having a frequency approximately equal to that of the carrier;

phaser means for generating a second periodic wave by altering a phase of the first periodic wave;

first demodulation means for demodulating a signal by multiplying the signal on the carrier by the first periodic wave, obtaining correlation between a spreading code and the signal multiplied by the first periodic wave and transmitting a first correlation value to data value determination means;

second demodulation means for demodulating a signal by multiplying the signal on the carrier by the second periodic wave, obtaining correlation between the spreading code and the signal multiplied by the second periodic wave and transmitting a second correlation value to said data value determination means; and said data value determination means for receiving a signal demodulated by said first demodulation means and a signal demodulated by said second demodulation means, outputting a result of addition of the first correlation value and the second correlation value as a correlation value between a received signal and the spreading code, and outputting a data value depending on whether or not the correlation value obtained as the result of the addition is larger than a half of a maximum value obtained by an addition.

6. The receiver according to claim 4, wherein the phase of the first periodic wave is different by 90 degrees from the phase of the second periodic wave.

7. A method of processing a signal by a receiver for use in a spread spectrum communications system using a spreading code of a predetermined pattern in data transfer, comprising the steps of:

multiplying received differential-decoded data by a periodic wave having a predetermined frequency;

binarizing a result of multiplication;

differential-decoding a binarized output; and obtaining correlation between differential-decoded data and the spreading code determining a digital value by comparing a number of chips indicating 0 and a number of chips indicating 1 in data obtained in the obtaining step.

8. A method of performing spread spectrum communications for transferring data on a carrier having a predetermined frequency between a transmitter and a receiver using a spreading code of a predetermined pattern in data transfer, said receiver performing the steps of:

multiplying differential-decoded data received from the transmitter by a periodic wave having a predetermined frequency;

binarizing a multiplication result;

differential-decoding a binarized output;

obtaining correlation between the differential-decoded data and the spreading code;

determining a digital value by comparing a number of chips indicating 0 and a number of chips indicating 1 in the differential-decoded data when the correlation is obtained in the step of obtaining the correlation; wherein a frequency of the spreading code is set as four or more times a difference between the frequency of the carrier and the frequency of the periodic wave.

9. A method of processing a signal by a receiver for use in a spread spectrum communications system for transmitting and receiving a spread-modulated base band signal on a carrier, comprising the steps of:

(a) multiplying the signal on the carrier by a first periodic wave having a frequency approximately equal to a frequency of the carrier, demodulating the signal in reverse-spread and obtaining correlation between a spreading code and the signal multiplied by the first periodic wave;

(b) multiplying the signal on the carrier by a second periodic wave different in phase from the first periodic wave, demodulating the signal in reverse-spread and obtaining correlation between the spreading code and the signal multiplied by the second periodic wave; and (c) selecting the signal demodulated in step (a) when the correlation obtained in step (a) is larger than the correlation obtained in step (b) and selecting the signal demodulated in step (b) when the correlation obtained in step (b) is larger than the correlation obtained in step (a).

10. The receiver according to claim 5, wherein the phase of the first periodic wave is different by 90 degrees from the phase of the second periodic wave.

11. A method of processing a signal by a receiver for use in a spread spectrum comminations system for transmitting and receiving a spread-modulated base band signal on a carrier, comprising the steps of:

(a) multiplying the signal on the carrier by a first periodic wave having a frequency approximately equal to a frequency of the carrier, demodulating the signal in reverse-spread and obtaining correlation between a spreading code and the signal multiplied by the first periodic wave;

(b) multiplying the signal on the carrier by a second periodic wave different in phase from the first periodic wave, demodulating the signal in reverse-spread and obtaining correlation between the spreading code and the signal multiplied by the second periodic wave; and (c) adding the correlations obtained in step (a) and (b) and outputting a data value depending on whether or not a result of the addition is larger than a half of a maximum value obtained by the addition.

* * * * *

UNITED STATES PATENT AND TRADEMARK OFFICE
CERTIFICATE OF CORRECTION

PATENT NO. : 6,154,482
DATED : November 28, 2000
INVENTOR(S) : Hiroyuki Inuzuka

It is certified that error appears in the above-identified patent and that said Letters Patent is hereby corrected as shown below:

Column 3,
Line 12, after "invention," please insert -- the receiver --;
Line 65, please change "reverse spread" to -- reverse-spread --;

Column 8,
Line 33, please change "is" to -- 1s --;

Column 12,
Line 18, after "errors.", please begin a new paragraph, line 19, indenting the first line, starting with "FIGS. 11A and 11B";

Column 15,
Line 40, after "respectively" please insert -- , --;

Column 18,
Line 28, please change "binarized output; and" to -- binarized output; --;
Line 30, please change "spreading code" to -- spreading code; and --;

Column 19,
Line 15, please change "comminations" to -- communications --.

Signed and Sealed this

Twenty-seventh Day of August, 2002

Attest:

JAMES E. ROGAN
Attesting Officer    Director of the United States Patent and Trademark Office